United States Patent
Van Peursem

[15] 3,700,179
[45] Oct. 24, 1972

[54] RESILIENTLY MOUNTED AUGER MECHANISM

[72] Inventor: Marvin Van Peursem, Newton, Iowa

[73] Assignee: Koehring Company, Milwaukee, Wis.

[22] Filed: Jan. 28, 1971

[21] Appl. No.: 110,682

[52] U.S. Cl.................241/301, 198/213, 241/186 A
[51] Int. Cl. .....................B02c 11/04, B02c 13/286
[58] Field of Search..241/101 M, 186 R, 186 A, 222, 241/301; 146/79, 113 A; 198/213, 64

[56] References Cited
UNITED STATES PATENTS

| | | |
|---|---|---|
| 3,375,985 | 4/1968 | Dodgen et al............146/79 X |
| 2,607,472 | 8/1952 | Senstock...............198/213 X |
| 3,352,354 | 11/1967 | Brock....................198/213 X |

Primary Examiner—Robert L. Spruill
Attorney—Andrew J. Beck

[57] ABSTRACT

A farm mechanism including an auger-type feeder, at least a portion of which is yieldably supported by a diaphragm-mounted motor.

4 Claims, 4 Drawing Figures

PATENTED OCT 24 1972 3,700,179
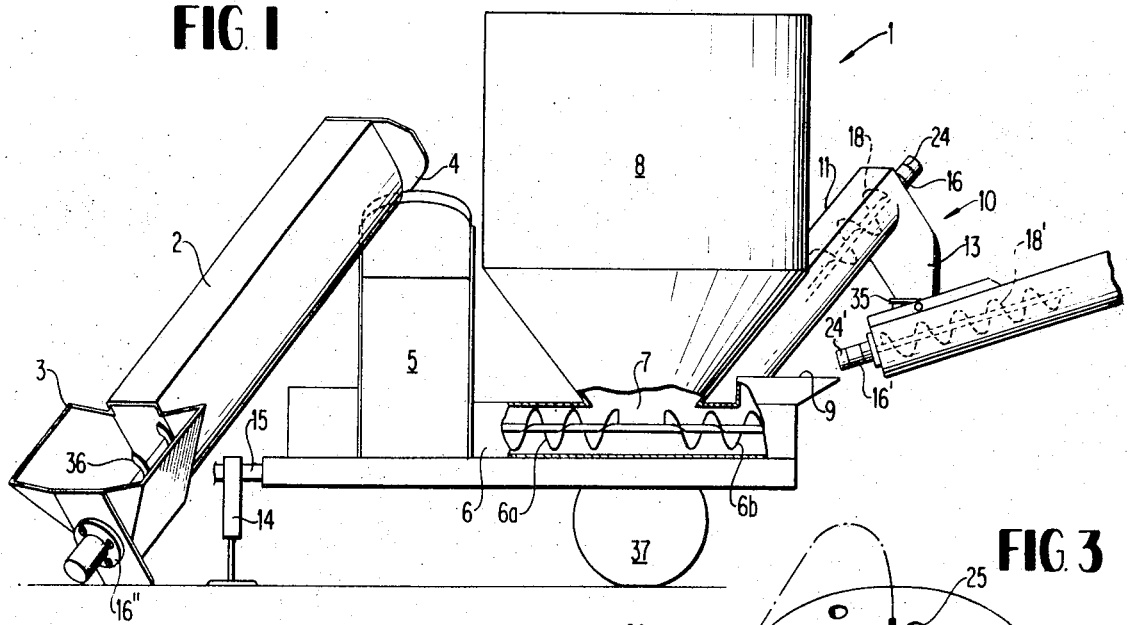
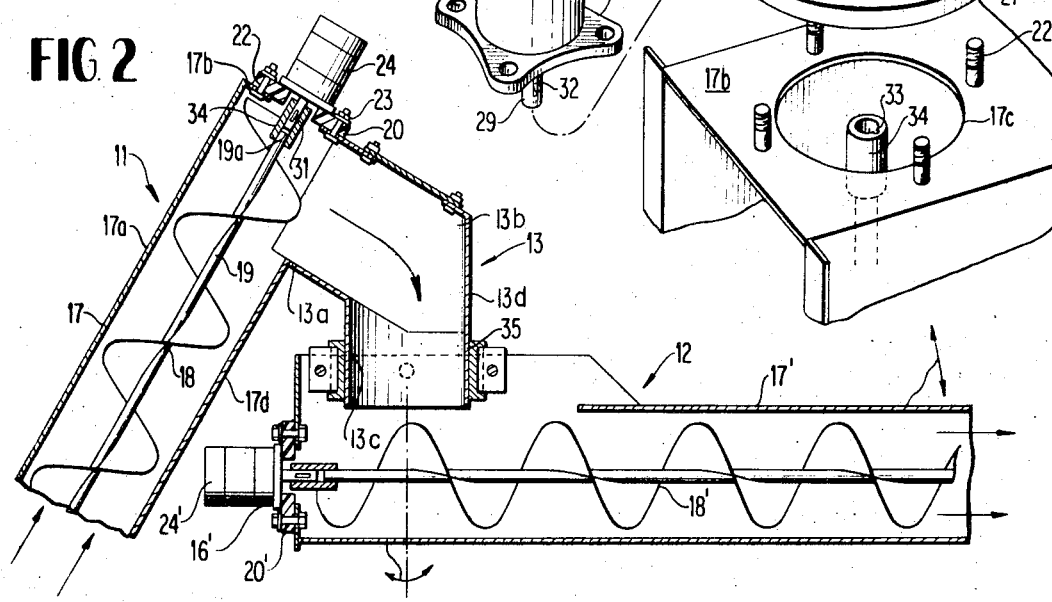
INVENTOR
MARVIN VAN PEURSEM
BY Andrew J. Beck
and Charles W. Walton
ATTORNEYS

RESILIENTLY MOUNTED AUGER MECHANISM

GENERAL BACKGROUND, OBJECTS AND BRIEF SUMMARY OF INVENTION

In farming or agricultural operations, it frequently is necessary to convey or feed particulate material. Such particulate material may be prepared by particulating devices such as grinder-mixers. Exemplary of devices of this type is a Brady 750 Hydra-Mill Hydraulic Grinder-Mixer, available from Koehring Farm Division of Des Moines, Iowa. This unit is described in Koehring Farm Division brochure 15T470L34.

Such devices employ auger-type feeder mechanisms to convey materials such as grain, corn and/or hay to a hammermill for particulation. Particulated material is conveyed from the hammermill to a storage hopper or tank included in the unit. A series of mutually articulated troughs, tubes or housings, each of which is provided with an auger-type feeder, serves to convey particulated material from the tank to a selected site.

Because of the nature of the commodity materials being particulated and fed, the auguer-type feeder mechanisms used in units of the type under discussion, and in a variety of other agricultural and industrial units, are at times subjected to intense transverse and axial loads. In addition, the torque reaction of the auger units, during feeding operations, may impose high torque reaction loads on drive motors associated with the auger units. These loads sometimes cause deflections and permanent buckling in the housings of these auger-type feeder mechanisms because they are generally of light construction in the interests of portability.

Heretofore, to circumvent structural damage induced by such transverse, axial, thrust, torque and vibration loads, a particularly rugged framing and mounting arrangement has been provided.

In addition, the use of conventional bearing mounts for each end of auger units has required a degree of complexity and precision in auger mounting, thereby increasing the cost and complication of fabrication operations.

More significantly, the conventional bearing mounting arrangement, which has substantially rigidified the auger units in relation to their associated troughs, has made it difficult to adequately relieve excessive stresses of the type heretofore described.

Accordingly, it is a principal object of the present invention to provide apparatus which retains or exceeds the beneficial operating characteristics of existing agricultural mechanisms and/or feeder mechanisms while substantially minimizing or eliminating the various problems heretofore noted.

It is a related object of the invention to provide such an apparatus which eliminates the necessity for using precision bearing mountings for each end of an auger-type feeder.

Yet another object of the invention is to provide such apparatus which enables auger-type feeders to automatically relieve feeding operation generated stress and thereby permit high speed operations, free of excessive vibration or shaking or at least characterized by substantially reduced vibration and shaking.

A still further object of the invention is to provide such an apparatus with a yieldably mounted conveyor.

In accomplishing these objects, an apparatus is presented which includes housing means and auger means extending longitudinally therein.

Diaphragm means constructed of resilient material extend generally transversely of this housing means and generally encircle a portion of the auger means. A drive means, such as a motor, is mounted on this diaphragm means to be movable relative to the housing means. The resilient nature of the diaphragm means permits such relative movement, both laterally and axially of the axis of rotation of the auger means. In addition, this construction provides a stress relieving property which enables the diaphragm means to absorb stress imposed thereon by the drive means.

A still further and independently significant facet of the invention pertains to the utilization of the aforesaid diaphragm mounting arrangement for auger and auger drive units which serve to in-feed and out-feed material from a conduit means.

BRIEF DESCRIPTION OF DRAWINGS

In describing the invention, reference will be made to one embodiment shown in the appended drawings forming a part of the instant disclosure wherein:

FIG. 1 is a side elevational, fragmentary, and partial view of an agricultural grinder-mixer which is provided with a series of auger-type conveyors, certain of which are partially mounted by the resilient diaphragm apparatus of this invention;

FIG. 2 is an enlarged, fragmentary and generally vertically sectioned view of in-feed and out-feed auger conveyors of the FIG. 1 mechanism, associated with and disposed at opposite ends of an articulated, swivel-type conduit means;

FIG. 3 is a perspective, "exploded" view, illustrating principal components of the diaphragm mounting arrangement incorporated in each of the auger conveyors illustrated in FIG. 2;

FIG. 4 is a partially sectioned view of the aforesaid diaphragm mounting arrangement providing an exterior view of a collar coupling which may be employed to interconnect a diaphragm mounted motor and an auger shaft, and further illustrating threaded fastenings which may serve to mount a drive motor on its supporting diaphragm.

GENERAL CONTEXT OF INVENTION

As shown in FIG. 1, the grinder-mixer apparatus 1 comprises an auger-type conveyor 2 which is operable to receive material to be particulated. This material is received in a conveyor hopper 3 and is discharged at an upper end 4 of the unit 2.

Material discharged at upper end 4 of auger unit 2 is fed into the mouth of a hammermill-type, particulating unit 5. Material particulated within the unit 5 is conveyed by another auger-type conveyor unit 6 to a receiving zone 7 at the lower end of a storage bin 8. Additive materials may also be conveyed by the auger 6 to the hopper inlet zone 7. Such additive or supplementary materials may be introduced into the apparatus at an inlet zone 9, as shown schematically in FIG. 1.

As is apparent from FIG. 1, the feed directions of auger portion 6a and 6b of the auger unit are such as to convey material from the hammermill 5 and additive zone 9, toward the centrally located inlet or receiving zone 7.

Particulated material received within the bin 8 is discharged through selectively or manually controlled operation of an articulated auger assembly 10. Auger assembly 10 includes a primary auger-type feed unit 11, a secondary, auger-type feed unit 12 and a swivel-type, articulated conduit coupling 13 interconnecting the primary and secondary auger units.

Grinder-mixer 1 may be portable in nature and be supported on tire assemblies 37. A conventional, screw-type jack 14, pivotally supported at the forward end of a towing hitch 15 of the unit 1, may serve to support the unit 1 when it is detached from a towing device.

In the operation of grinder-mixer 1, material to be particulated, such as hay, corn, etc., is injected into the hopper 3. The material is conveyed through unit 2 to the hammermill 5, where it is particulated or ground. The material is then conveyed by auger unit 6 into the interior of storage bin 8.

If desired, supplementary or additive materials may be fed into the bin 8 by injecting such materials into the inlet 9. As to such materials, auger portion 6b will serve to convey them into the bin interior.

As an operator so desires, and as influenced by conventional manual control mechanisms, the auger units 11 and 12 may be operated so as to convey material out of the interior of bin 8 and transmit such material to a desired location such as an annular feed trough. The disposition of the terminal or discharge end of secondary conveyor 12 may be adjusted, as desired, by pivoting unit 12 relative to feed unit 11 as permitted by the articulated or swivel-type conduit coupling 13. As will be understood, conduit coupling 13 serves to convey material from the upper discharge end of auger unit 11, to the lower material receiving end of auger unit 12.

A diaphragm arrangement for mounting auger drive components of each of the units 11, 12 and 2 is identified, respectively, by reference numerals 16, 16' and 16''. Apart from dimensional and minor structural characteristics, units 16, 16' and 16'' are substantially identical in structure and mode of operation in each of the mechanisms 11, 12 and 2. Accordingly, the invention will now be described in the context of the unit 16 which is incorporated in auger unit 11.

RESILIENT MOUNTING FOR AUGER AND AUGER DRIVE UNIT

As shown in FIG. 2, auger unit 11 comprises a generally enclosed trough or housing means 17. A conventional auger 18 is supported within and extends longitudinally of the trough 17. The lower end of the shaft 19 of auger 18 is journaled in a lower end wall portion of trough 17, generally adjacent but beneath an apertured portion of the upper wall 17a of trough 17. This apertured upper wall portion provides communication between the interior of trough 17 and the interior of bin 8.

A journal-type mounting for the lower end of shaft 19 may be such as to permit or accommodate limited axial movement of the auger 18.

For purposes of this discussion, and in view of the succeeding description, trough 17 may be considered as a first trough means and auger 18 as a first auger means.

The upper end of auger 18 is supported by the first mounting means 16. This mounting means 16 supports an upper end portion 19a of auger shaft 19 so as to relieve both lateral and axial forces acting on the auger 19.

This is accomplished by structural characteristics of mounting means 16 now to be described.

Mounting means 16 comprises a first disc-like, elastomeric and resilient diaphragm or diaphragm means 20. Diaphragm means 20 may be annular and plate-like in configuration, as shown in FIG. 3, and fabricated from material such as, for example, 12-ply, nylon reinforced, elastomeric tire casing. This diaphragm means may be provided with a plurality of circumferentially spaced and generally longitudinally extending mounting apertures 21.

Mounting apertures 21 enable the diaphragm means 20 to be inserted over, and supported by, threaded studs 22 which project generally longitudinally from trough end wall 17b. With the diaphragm means 20 positioned so that the studs 22 project through the openings 21, diaphragm means 20 may be secured in place by threaded fastening means 23 which engage the upper ends of the studs 22 as generally shown in FIG. 2.

A driving motor 24, possibly of an hydraulic type, is supported entirely on the diaphragm means 20. This support is effected by utilization of another series of circumferentially spaced and longitudinally extending diaphragm apertures 25. Apertures 25 are aligned so as to conform to a pattern of mounting aperture 26 formed in a base plate 27 of drive means or motor 24. Thus, as shown in FIG. 4, a series of threaded fasteners 28 may pass through the aligned apertures 25 and 26 so as to firmly secure the drive unit base plate 27, and thus the drive unit itself, to the diaphragm 20.

With the drive unit 24 thus secured, a drive shaft 29 projects through a central aperture 30 of diaphragm 20. Drive shaft portion 29 is coupled with shaft 19 of auger 18 by a conventional key and collar arrangement. This key and collar arrangement may comprise a segmental key 31 which is received within a segmental socket 32 of drive shaft 29 and slidably received within a longitudinally extending, torque transmitting, interior slot 33 of a collar 34, with collar 34 being carried by and fixed to the auger shaft 19.

This arrangement facilitates mounting of the auger 19 and auger support mechanism 16 in that the shaft 29, with the key 31 installed, may be moved axially through an end plate aperture 17c of end wall 17b so as to cause the key to telescopingly enter the slot 33, with the shaft portion 29 telescopingly entering the collar 34.

With the arrangement heretofore described, the drive shaft 29 may be considered as an extension or continuation of the shaft portion of the auger 18. Thus, the diaphragm means 20, which is preferably elastomeric or resilient in nature, extends transversely of the longitudinal axis of the trough 17 and generally encircles the upper extended portion of auger 18.

The first drive means or motor 24 associated with the unit 11 is mounted on a diaphragm means 20. Because of the resilient and diaphragm nature of the diaphragm means 20, the drive unit 24 is movable axially and transversely of the trough means 17, as permitted by the elastomeric or resilient characteristics of the diaphragm 20.

As has been heretofore noted, the drive means 24 is disposed in driving engagement with the upper portion of the auger 18, which upper portion is defined by the shaft portion 29.

The diaphragm 20, in thus supporting the upper end of auger shaft 19 and the motor unit 24 for resilient and yieldable movement, both transversely and axially of the axis of rotation of the auger 18, is operable to relieve transverse and axial loads imposed on the auger 18. In other words, during the operation of auger 18, when excessive feeding stress develops, the auger 18 is able to move transversely or, to some extent, axially of the trough 17 so as to relieve material feeding generated stresses.

In addition, the thickness of the diaphragm 20 and the ruggedized nature of the diaphragm 20, enables reaction torque transmitted from the auger 18 to the drive unit 24 to be substantially absorbed within the body of the diaphragm 20. In this connection, it is contemplated that the diaphragm 20, fabricated as heretofore described from 12-ply nylon tire casing, may have a width of approximately one-half inch, with mounting holes 21 being located on a circle having a diameter of approximately 5 ½ inches, and with motor mount apertures 25 being located on a circle having a diameter of approximately 3 ¼ inches. It is also contemplated that in this particular embodiment of the invention, the central aperture 30 of diaphragm 20 may have a diameter of approximately 2 inches.

As will be apparent from the foregoing discussion, the diaphragm 20 cooperates with the motor 24, including the motor housing and base plate 27, to define a first, flexible end wall closing the upper end of the first trough means 17.

The flow diverting or material transferring conduit means 13 includes a first aperture means 13a. Aperture means 13a is formed in an upper and downwardly facing base wall 17d of trough 17 and provides a flow path leading generally transversely out of the trough means 17. As shown in FIG. 2, this aperture means 13a is located generally adjacent and somewhat beneath the diaphragm 20. Mechanism 10 additionally includes a V-shaped conduit means 13b which serves to convey particulated agricultural commodity materials away from the aperture 13a and generally downwardly toward secondary feed unit 12.

The first auger means 18, because of its mounting in relation to diaphragm means 20, is permitted to move generally toward and away from the aperture 13a.

Articulated auger assembly 13 additionally includes, as heretofore noted, the secondary auger feeder unit 12. Auger feeder unit 12 includes a second trough means 17' corresponding generally to first trough means 17. Auger unit 13 additionally includes a second auger unit 18' corresponding generally to first auger unit 18. A second mounting means 16', generally identical to mounting means 16, serves to support the lower end of auger 18'.

Mounting means 16' includes a diaphragm means 20' which provides the resilient support for auger 18' and a drive unit 24' associated with auger 18', in a manner identical to that described in connection with auger 18, mounting means 16, diaphragm 20, and drive motor 24. Further, motor unit 24' and diaphragm means 20' cooperate to define a flexible, lower end wall for trough means 17'.

Articulated coupling means 13 also includes a second aperture means 13c which provides a flow path leading transversely into the interior of the second trough means 17'. As shown in FIG. 2, second aperture means 13c is located generally adjacent the diaphragm means 20' incorporated in mounting means 16'. This arrangement permits the auger 18' to move generally toward and away from the aperture means 13c.

The articulated coupling means 13 includes a now well-known, swivel-type mounting 35 which enables the trough 17' to be rotated about the downwardly disposed leg 33d of conduit means 13b, as shown in FIG. 2.

With this arrangement, material may be fed out of bin 8 by auger 18, pass through the interior of conduit means 13b, and be fed to a desired location by auger 18'. Feed stresses generated within the auger units 11 and 12 may be substantially relieved by the diaphragm means 20 and 20', and drive torque absorbed by the diaphragm means 20 and 20' in the manner previously noted.

Further, the cooperative influence of the diaphragm mounting means 20 and 20', in relation to the transfer conduit means 13b, is believed to provide a particularly effective mechanism operable to relieve jams in this transition zone. With the diaphragms 20 and 20' permitting the auger units 18 and 18' to move toward and away from the aperture means 13a and 13c respectively, a synergistic, stress relieving action may take place in this transition zone so as to prevent jamming conditions and promote material feeding.

As will also be noted with reference to FIG. 1, the feed conveyor 2 may be provided with a diaphragm-type mounting arrangement 16'', substantially identical to mounting means 16 and 16', and operable to support an auger-type conveyor 36 incorporated in the mechanism 2.

SUMMARY OF MAJOR ADVANTAGES AND GENERAL SCOPE OF INVENTION

A most significant facet of the invention resides in the manner in which the diaphragm-type mounting means are operable to relieve lateral and axially directed forces acting on the auger units and substantially absorb reaction or drive torque. This aspect of the invention enables the auger units to be operated at optimum speed conditions, while substantially avoiding or minimizing shaking or vibration generated during feeding operations. In addition, special framing or supporting mechanisms to offset torque acting on the drive motor 24 may be eliminated.

It is also especially significant to note that the diaphragm-type mounting arrangement totally eliminates the necessity for bearing-type, journal mountings at the ends of the auger units supported by the diaphragm mechanism and eliminates the necessity for precise, auger mounting, dimensional criteria.

The cooperative influence of the diaphragm mountings at opposite ends of the transfer conduit means, in the articulated multiple auger conveyor unit, is believed to effectively minimize jam tendencies in this portion of the apparatus and eliminate the generation of potentially injurious stress in this area of the apparatus.

While the invention has been described with reference to a particular arrangement of utility, it will be appreciated that the diaphragm mounting concept affords broad advantages wherever auger feed mechanisms are utilized. Clearly, the invention may be employed in the context of auger units, housings, drive units and areas of application other than those set forth in connection with the preferred embodiment.

In addition, it will be recognized that the dimensions, shape, and mounting characteristics of the diaphragm means may be varied substantially, while attaining advantages heretofore described.

Thus, those skilled in the feeding art and familiar with the disclosure of this invention, may recognize additions, deletions, substitutions or other modifications which would fall within the scope of the invention as set forth in the appended claims,

I claim:

1. In an agricultural hammermill for processing agricultural material, said hammermill comprising:
   material processing means for particulating and storing said material including,
   material particulating means, and
   storage means for storing particulated material;
   conveyor means operatively connected to said material processing means for conveying material with respect to said material processing means, said conveyor means including,
   a housing,
   auger means having a central longitudinal axis, said auger means being positioned within said housing,
   motor means connected to said auger means and having a longitudinal axis thereof radially fixed with respect to the longitudinal axis of said auger means, and
   means connecting said motor means to said housing for resilient yieldable movement relative to said housing to relieve force acting upon said auger means within said housing.

2. In an agricultural hammermill for processing agricultural material as defined in claim 1 wherein:
   said conveyor means is operably connected to said material particulating means for delivering material to be particulated thereinto.

3. In an agricultural hammermill for processing agricultural material as defined in claim 1 wherein:
   said conveyor means is operatively connected to said storage means for directing particulated material away from said storage means.

4. In an agricultural hammermill for processing agricultural material as defined in claim 1 wherein said means connecting said motor means to said housing comprises:
   diaphragm means constructed of resilient material.

* * * * *